(12) United States Patent  
Waldner et al.

(10) Patent No.: US 7,132,946 B2
(45) Date of Patent: Nov. 7, 2006

(54) VARIABLE FREQUENCY RADIO FREQUENCY IDENTIFICATION (RFID) TAGS

(75) Inventors: Michele A. Waldner, Minneapolis, MN (US); David P. Erickson, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 175 days.

(21) Appl. No.: 10/820,584

(22) Filed: Apr. 8, 2004

(65) Prior Publication Data

US 2005/0237198 A1    Oct. 27, 2005

(51) Int. Cl.
*G08B 13/14* (2006.01)

(52) U.S. Cl. .............. 340/572.1; 340/572.7; 340/10.2

(58) Field of Classification Search ............. 340/572.1, 340/572.7, 10.1, 10.4, 572.4, 572.5, 10.2; 343/745, 757; 455/75, 77, 78, 87
See application file for complete search history.

(56) References Cited

U.S. PATENT DOCUMENTS

| | | | |
|---|---|---|---|
| 4,260,990 A | 4/1981 | Lichtblau | |
| 4,782,345 A | 11/1988 | Landt | |
| 4,870,391 A | 9/1989 | Cooper | |
| 5,142,292 A | 8/1992 | Chang | |
| 5,446,447 A * | 8/1995 | Carney et al. | 340/572.4 |
| 5,771,021 A | 6/1998 | Veghte et al. | |
| 5,892,300 A | 4/1999 | Rydval | |
| 5,940,043 A | 8/1999 | Canipe et al. | |
| 5,977,875 A | 11/1999 | Lin et al. | |
| 6,037,879 A | 3/2000 | Tuttle | |
| 6,043,792 A | 3/2000 | Finlayson | |
| 6,070,803 A * | 6/2000 | Stobbe | 235/492 |
| 6,107,920 A | 8/2000 | Eberhardt et al. | |
| 6,147,605 A | 11/2000 | Vega et al. | |
| 6,480,110 B1 * | 11/2002 | Lee et al. | 340/572.5 |
| 6,617,962 B1 | 9/2003 | Horwitz et al. | |
| 6,624,743 B1 * | 9/2003 | Ikefuji et al. | 340/10.4 |
| 6,889,036 B1 * | 5/2005 | Ballweber et al. | 455/292 |
| 2002/0180588 A1 | 12/2002 | Erickson et al. | |
| 2002/0196126 A1 | 12/2002 | Eisenberg et al. | |

FOREIGN PATENT DOCUMENTS

| | | |
|---|---|---|
| EP | 1 026 832 | 8/2000 |
| EP | 1 045 526 | 10/2000 |
| EP | 1 061 663 | 12/2000 |
| EP | 0 829 921 B1 | 6/2001 |
| FR | 2 757 952 | 7/1998 |

(Continued)

OTHER PUBLICATIONS

"Multi-Loop Antenna For Radio-Frequency Identification", filed Mar. 3, 2003, Serial No. 10/378,458.

*Primary Examiner*—Toan N. Pham
(74) *Attorney, Agent, or Firm*—Melissa E. Buss

(57) ABSTRACT

Various radio frequency identification (RFID) tags are described that dynamically vary their resonant frequency to reduce or eliminate the potential effects of electromagnetic "tag-to-tag" coupling. An RFID tag, for example, includes a main antenna tuned to a first resonant frequency, and switching circuitry that dynamically changes the resonant frequency of the main antenna. The switching circuitry may selectively couple electrical elements, such as capacitive elements, inductive elements, or combinations thereof, to vary the resonant frequency of the RFID tag. The RFID tag may include a sensing circuit that determines when to selectively couple the electrical element to the main antenna to adjust the resonant frequency of the main antenna.

38 Claims, 7 Drawing Sheets

FOREIGN PATENT DOCUMENTS

| | | | | | |
|---|---|---|---|---|---|
| GB | 2 307 379 | 5/1997 | WO | 98/05088 | 2/1998 |
| GB | 2 321 726 | 8/1998 | WO | 98/31070 | 7/1998 |

* cited by examiner

VARIABLE FREQUENCY RADIO FREQUENCY IDENTIFICATION (RFID) TAGS

TECHNICAL FIELD

The invention relates to radio frequency identification (RFID) systems for article management and, more specifically, to RFID tags.

BACKGROUND

Radio-Frequency Identification (RFID) technology has become widely used in virtually every industry, including transportation, manufacturing, waste management, postal tracking, airline baggage reconciliation, and highway toll management. A typical RFID system includes a plurality of RFID tags, at least one RFID reader or detection system having an antenna for communication with the RFID tags, and a computing device to control the RFID reader. The RFID reader includes a transmitter that may provide energy or information to the tags, and a receiver to receive identity and other information from the tags. The computing device processes the information obtained by the RFID reader.

In general, the information received from an RFID tag is specific to the particular application, but often provides an identification for an article to which the tag is fixed. Exemplary articles include manufactured items, books, files, animals or individuals, or virtually any other tangible article. Additional information may also be provided for the article. The tag may be used during a manufacturing process, for example, to indicate a paint color of an automobile chassis during manufacturing or other useful information.

The transmitter of the RFID reader outputs RF signals through the antenna to create an electromagnetic field that enables the tags to return an RF signal carrying the information. The transmitter makes use of an amplifier to drive the antenna with a modulated output signal.

A conventional tag may be an "active" tag that includes an internal power source, or a "passive" tag that is energized by the field created by the RFID reader antenna. Once energized, the tags communicate using a pre-defined protocol, allowing the RFID reader to receive information from one or more tags. The computing device serves as an information management system by receiving the information from the RFID reader and performing some action, such as updating a database. In addition, the computing device may serve as a mechanism for programming data into the tags via the transmitter.

SUMMARY

In general, radio frequency identification (RFID) tags are described that automatically and dynamically vary their resonant frequency to reduce or eliminate the potential effects of electromagnetic "tag-to-tag" coupling. In some environments, the distance between the articles is limited, and multiple articles may be simultaneously present within the electromagnetic field produced by the reader antenna. As a result, electromagnetic "coupling" may occur between some of the RFID tags attached to the articles, which results in a shift of the resonant frequency of some of the tags. This shift in resonance frequency may compromise the ability of the RFID tags to communicate with the RFID reader.

The techniques described herein automatically compensate for variations in resonance frequency that may occur due to tag-to-tag coupling by changing the resonant frequency at which the RFID tag backscatters radio frequency energy. In this manner, the techniques may allow the RFID tag to maintain effective RFID communications even when experiencing substantial tag-to-tag electromagnetic coupling.

In one embodiment, an RFID tag comprises a main antenna tuned to a first resonant frequency; and switching circuitry that dynamically changes the resonant frequency of the main antenna.

In another embodiment, a method comprises operating a main antenna of a radio frequency identification (RFID) tag at an associated resonate frequency and dynamically changing the resonant frequency of the main antenna.

In another embodiment, an RFID system comprises an RFID interrogation device, an RFID tag associated with an article, wherein the interrogation device interrogates the RFID tag to obtain information regarding the article, and a computing device to process the information retrieved from the RFID interrogation device. The RFID tag includes a main antenna tuned to a first resonant frequency, an integrated circuit electrically coupled to the main antenna that stores information of the associated article, and switching circuitry that selectively couples one or more elements to the main antenna to adjust the resonant frequency of the main antenna.

The details of one or more embodiments of the invention are set forth in the accompanying drawings and the description below. Other features, objects, and advantages of the invention will be apparent from the description and drawings, and from the claims.

DETAILED DESCRIPTION

In conventional radio-frequency identification (RFID) systems, RFID tags may interfere with one another when the RFID tags are placed in close proximity to one another. It has been determined that electromagnetic coupling between such tags may result in a shift of the resonant frequencies of the tags. This shifted resonant frequency may not provide a given one of the RFID tags with a sufficient induced current to power the tag, thereby causing the RFID tag to be out of the detectable frequency range of the interrogation device.

In general, the magnitude of the resulting frequency shift is dependent upon the distance between the RFID tags, the size of the tags, the amount of coplanar overlapping that occurs between the tags, and the total number of tags that overlap. Some exemplary measurements of frequency shift due to tag-to-tag coupling are shown in Table 1 below when multiple tags where placed within a fixed proximity of each other in an overlapping position. In Table 1, A is the height of the tag, B is the width of the tag, N is the number of overlapping tags, X is the distance between consecutive tags, and F is the resultant resonant frequency of the tag. Although the exemplary measurements shown in Table 1 are downward frequency shifts, the frequency shifts caused by tag coupling may also be upward frequency shifts. As can be seen from Table 1, electromagnetic coupling between ten overlapping tags can shift the frequency at which the tags respond approximately 2 MHz, which may result in the inability for the reader to successfully communicate with the tags, or significantly reduce the read range.

TABLE 1

| A (Inches) | B (Inches) | N | X (Inches) | F (MHz) |
|---|---|---|---|---|
| 2 | 3 | 1 | — | 13.56 |
| 2 | 3 | 2 | .75 | 13.2 |
| 2 | 3 | 10 | .75 | 10.5 |
| .5 | 1.5 | 1 | — | 13.56 |
| .5 | 1.5 | 2 | .375 | 13.4 |
| .5 | 1.5 | 10 | .375 | 10.6 |

Figure 1:
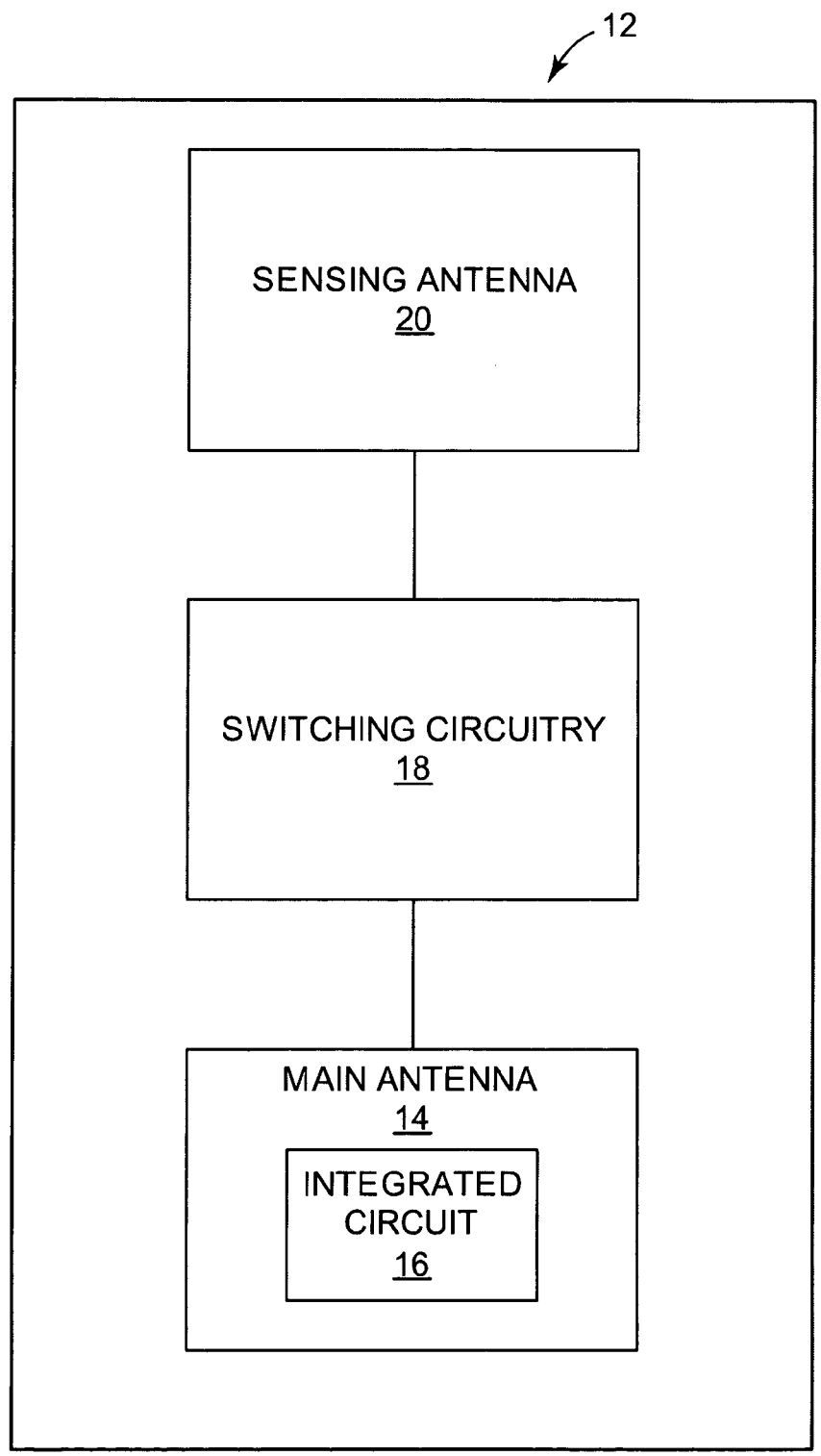
FIG. 1 is a block diagram illustrating an RFID tag that automatically and dynamically varies its resonant frequency to reduce or eliminate the potential effects of tag-to-tag coupling.

FIG. 1 is a block diagram illustrating an RFID tag 12 that automatically and dynamically varies its resonant frequency to reduce or eliminate the potential effects of tag-to-tag coupling. In particular, RFID tag 12 dynamically changes its resonant frequency to function in environments in which there is tag-to-tag coupling as well as environments where no tag-to-tag coupling occurs. In other words, RFID tag 12 automatically compensates for shifts in resonance frequency that may occur due to tag-to-tag coupling by changing the resonant frequency of RFID tag 12 so that a sufficient current level is induced to power RFID tag 12, thereby maintaining effective RFID communications.

In the illustrated embodiment of FIG. 1, RFID tag 12 includes a main antenna 14 that is electrically coupled to an integrated circuit 16, often referred to as an "RFID chip." Main antenna 14 is tuned to a particular frequency, which may be, for example, either the operating frequency of the RFID system, a lower frequency than the operating frequency, or a frequency higher than the operating frequency of the RFID system. Integrated circuit 16 often includes internal memory (not shown) for storing information related to the article to which RFID tag 12 is affixed.

In operation, main antenna 14 receives RF energy from a source, and backscatters RF energy in a manner well known in the art. It is this backscattered RF energy that provides a signal by which an interrogator, such as an RFID reader or detection system, obtains information from RFID tag 12 and, more particularly, about an article with which RFID tag 12 is associated. RFID tag 12 includes switching circuitry 18 that automatically changes the frequency at which main antenna 14 resonates in order to compensate for situations in which the pertinent resonating frequency of the tag has been varied due to tag-to-tag coupling. Switching circuitry 18 may, for example, selectively switch in and out circuit elements, such as capacitive or inductive elements, thereby adjusting the resonant frequency of main antenna 14 to alternate between two or more resonant frequencies. For example, main antenna 14 may be initially tuned to a frequency that is higher than the operating frequency of a surrounding RFID system in order to compensate for situations where tag-to-tag coupling occurs. In some instances tag-to-tag coupling, therefore, reduces the pertinent resonance frequency of main antenna 14, causing main antenna 14 to induce sufficient current to power RFID tag 12. When no tag coupling or interference is present, switching circuitry 18 may automatically switch a capacitive element in parallel with main antenna 14 to reduce the frequency at which main antenna 14 resonates, thus reducing the pertinent resonant frequency to the frequency of the surrounding system. Subsequently, if tag-to-tag coupling is present, switching circuitry 18 may switch out the capacitive element, thus bringing the pertinent resonant frequency of main antenna 14 back up to the operating frequency of the RFID system.

In some embodiments, switching circuitry 18 may adjust the resonant frequency of main antenna 14 when RFID tag 12 is de-energized, i.e., when main antenna 14 is no longer in an RF field. In other words, switching circuitry 18 may adjust the resonating frequency of main antenna 14 for each power-up cycle. For example, switching circuitry 18 may automatically switch in or out one or more circuit elements to cause main antenna 14 to resonate at a first frequency during a first power-up cycle and a second frequency during a second power-up cycle. In this embodiment, RFID tag 12 may not need a mechanism for determining which resonant frequency is most optimum for RFID tag 12. Alternatively, switching circuitry 18 may automatically adjust the resonant frequency of main antenna 14 during a single power-up cycle. In this embodiment, RFID tag 12 determines whether main antenna 14 is resonating at an appropriate frequency and adjusts the resonant frequency of main antenna 14 when the induced voltage is insufficient to power RFID tag 12.

In some embodiments, RFID tag 12 may include sensing circuitry, such as a sensing antenna 20, for use in determining whether switching circuitry 18 should change the resonant frequency of main antenna 14. In other words, main antenna 14 is used for RFID communications, while sensing antenna 20 is used to determine whether switching circuitry 18 should change the resonant frequency of main antenna 14. Switching circuitry 18 automatically adjusts the resonant frequency of main antenna 14 based on which of main antenna 14 and sensing antenna 20 is operating at a more optimum frequency, i.e., closer to the system frequency. In this manner, sensing antenna 20 may be viewed as determining or sensing whether there is tag-to-tag coupling, and switching circuitry 18 essentially adjusts the resonant frequency of main antenna 14 based on whether tag-to-tag coupling is detected, thereby allowing the main antenna to induce current sufficient to power RFID tag 12. As a result, sensing antenna 20 may be small relative to main antenna 14, and need not necessarily be sufficiently sized to power RFID tag 12 itself.

For example, sensing antenna 20 may be tuned to the operating frequency of the RFID system, and main antenna 14 may be tuned to a frequency higher than the operating frequency of the RFID system. In an RFID system with an operating frequency of approximately 13.56 MHz, for example, sensing antenna 20 may be tuned to approximately 13.56 MHz and main antenna 14 may be tuned to approximately 20 MHz. Consequently, sensing antenna 20 induces sufficient current when: (1) RFID tag 12 is placed in an RF field that is approximately the same frequency as the tuned frequency of the sensing antenna, and (2) insufficient tag-to-tag coupling is experienced by the sensing antenna, i.e. the sensing antenna is operating near to the system frequency. This induced current causes switching circuitry 18 to switch a capacitive element in parallel with main antenna 14, resulting in a reduction in the resonant frequency of main antenna 14. In this manner, the resonant frequency of main antenna 14 is automatically lowered from its initial high frequency to the operating frequency of the surrounding RFID system.

When other tags are in close proximity to RFID tag 12, sensing antenna 20 experiences sufficient tag-to-tag coupling to reduce its resonant frequency below the operating frequency of the RFID system. As a result, the current induced by sensing antenna 20 falls below the defined threshold, causing switching circuitry 18 to switch out the capacitive element from main antenna 14, or if RFID tag 12 is not in the state with the capacitive element switched in, then switching circuitry 18 does not act. The increase in resonant frequency of main antenna 14 caused by switching out the capacitive element, however, is reduced to the operating frequency of the RFID system due to the tag-to-tag coupling. In this manner, RFID tag 12 automatically adjusts the resonant frequency of main antenna 14, and achieves communication regardless of whether other RFID tags are present and cause tag-to-tag coupling.

Although RFID tag 12 of FIG. 1 includes only a single sensing antenna, RFID tag 12 may include multiple sensing antennas and higher-order switching circuitry in order to provide RFID tag 12 with the capability to resonate at two or more frequencies. For example, RFID tag 12 may include two sensing antennas tuned to different frequencies. In this embodiment, switching circuitry 18 optionally switches in and out multiple circuit components to adjust the resonant frequency of main antenna 14, thereby allowing RFID tag 12 to resonate at three different frequencies depending upon the resonating frequencies of the sensing antennas and the amount of tag coupling. Additional sensing antennas may be utilized to increase the granularity by which switching circuitry 18 accounts for tag-to-tag coupling and controls main antenna 14 to resonate at or near the RFID system operating frequency.

Figure 2:
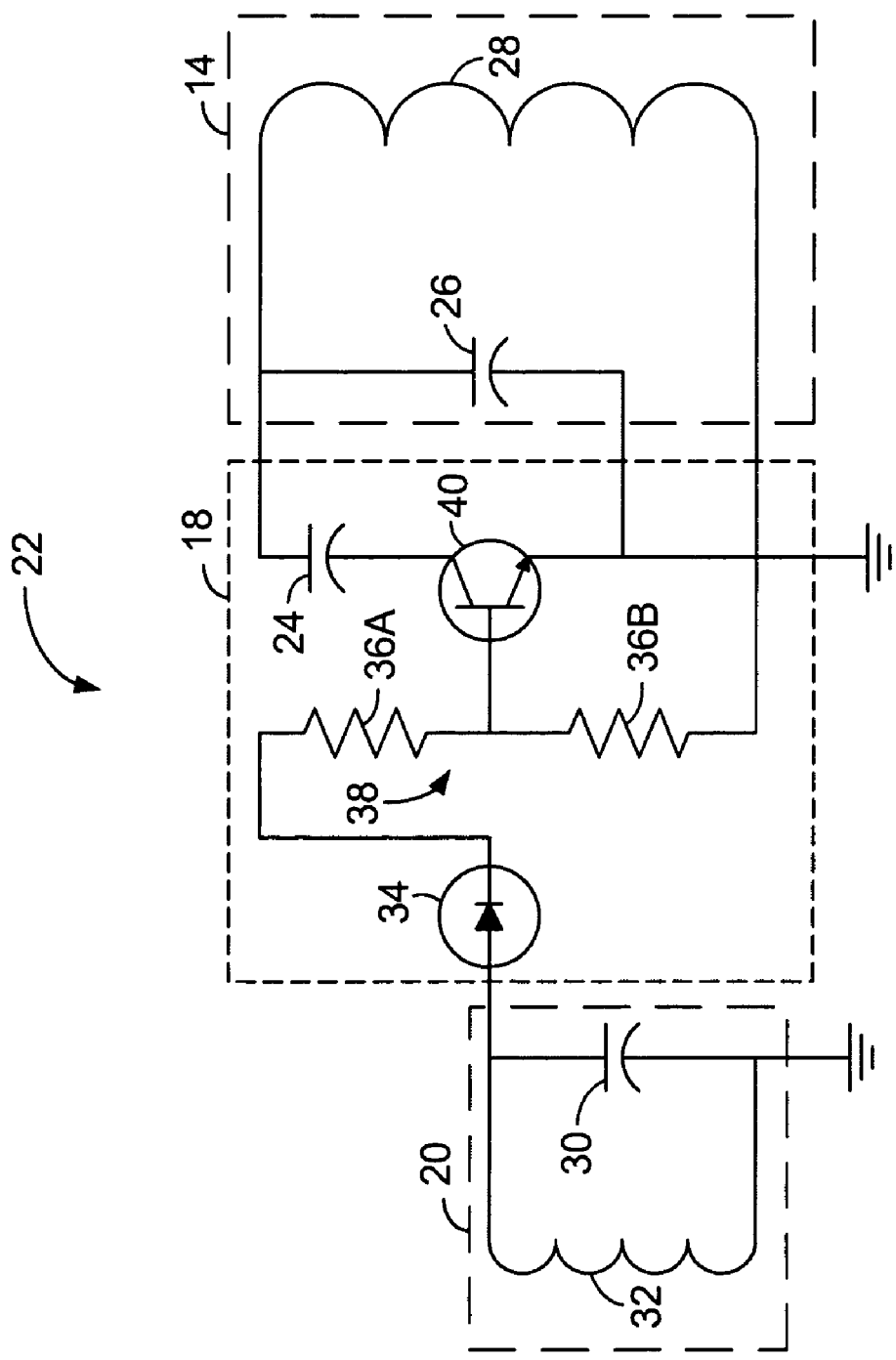
FIG. 2 is a circuit diagram illustrating one exemplary embodiment of an RFID tag capable of dynamically adjusting its resonant frequency.

FIG. 2 is a circuit diagram illustrating one exemplary embodiment of an RFID tag 22 capable of dynamically adjusting its resonant frequency. In the illustrated embodiment, RFID tag 22 includes a main antenna 14, a sensing antenna 20, and switching circuitry 18. Switching circuitry 18 selectively switches a capacitive element 24 in and out of parallel connection with main antenna 14 in order to change the resonant frequency of main antenna 14 to compensate for tag-to-tag coupling with other RFID tags located in close proximity. In particular, switching circuitry 18 switches capacitive element 24 into and out of parallel connection with main antenna 14 based on the amount of current induced by sensing antenna 20.

As a result, switching circuitry 18 may be viewed as dynamically controlling the resonant frequency of main antenna 14 based upon whether sensing antenna 20 is operating near the system operating frequency or has experienced a reduction in resonant frequency due to tag-to-tag coupling. In other words, switching circuitry 18 determines which of main antenna 14 and sensing antenna 20 is operating at the most optimum frequency, i.e., a frequency closest to the operating frequency of the RFID system, and switches in and out capacitive element 24 in accordance with the determination.

As shown in FIG. 2, main antenna 14 is represented as a capacitive element 26 and an inductive element 28. For example, capacitive element 26 may represent the capacitance of an integrated circuit (not shown) that is electrically coupled to main antenna 14 as well as the capacitive characteristics of conductive traces fabricated to form main antenna 14. Inductive element 28 may represent the inductance of the conductive traces forming main antenna 14. Sensing antenna 20 also includes a capacitive element 30 and an inductive element 32, which may represent the capacitive and inductive characteristics of conductive traces fabricated to form sensing antenna 20.

Switching circuitry 18 includes a diode 34, resistors 36A and 36B arranged to form a voltage divider 38, a transistor 40 and capacitive element 24. Diode 34 maintains the voltage resulting from the currents induced by antennas 14, 20 for application to transistor 40 by voltage divider 38, thereby controlling the switching functionality of switching circuitry 18. Voltage divider 38 controls the switching of capacitive element 24 in and out of parallel connection with main antenna 14.

Resistors 36A and 36B of voltage divider 38 can be selected to control the threshold at which transistor 40 turns on. For example, when the resistance of resister 36A is larger than the resistance of resistor 36B, transistor 40 will turn on with more induced current from sensing antenna 20. As described, transistor 40 is controlled by the voltage across voltage divider 38, which is directly proportional to the current induced in sensing antenna 20. Transistor 40 thus acts like a switch that switches capacitive element 24 into parallel connection with main antenna 14 when activated, and switches out capacitive element 24 when deactivated.

Specifically, when RFID tag 22 is placed in an RF field, e.g., when an interrogation device is attempting to interrogate RFID tag 22, respective currents are induced in main antenna 14 and sensing antenna 20. When the neighboring tags are far enough apart from RFID tag 22 that insufficient tag-to-tag coupling occurs, the current induced in sensing antenna 20 is stronger than the current induced in main antenna 14 due to the fact that sensing antenna 20 is tuned to the operating frequency of the RFID system, i.e., the frequency at which the interrogation device emits RF energy. The high current in sensing antenna 20 will raise the voltage across voltage divider 38 high enough to turn transistor 40 on, thereby switching capacitive element 24 into parallel connection with main antenna 14. In this manner, transistor 40 acts as a switch that is activated when the voltage of voltage divider 38 rises above a controlled threshold set point. Placing capacitive element 24 in parallel with capacitive element 26 reduces the resonant frequency of main antenna 14, e.g., from 20 MHz down to 13.56 MHz, based on the amount of capacitance of capacitive element 24. Capacitive element 24 may comprise any component with a storage capacitance, such as a capacitor, a diode, a transistor and the like.

However, when neighboring RFID tags are in close proximity to RFID tag 22, the resulting tag-to-tag coupling will reduce the frequency at which both main antenna 14 and sensing antenna 20 resonate. When the tag coupling reduces the resonant frequency of main antenna 14 far enough, main antenna 14 will be resonating at a frequency closer to the RFID system operating frequency (e.g., 13.56 MHz) than sensing antenna 20. When this occurs, the current induced in main antenna 14 increases, causing the voltage drop of voltage divider 38 to fall below the threshold set point. Therefore, transistor 40 is deactivated, and capacitive element 24 is switched out of parallel connection with main antenna 14. In this manner, the tag-to-tag coupling with neighboring tags will detune the frequency of main antenna 14 such that main antenna 14 is operating near the frequency at which the RFID system is operating, thus allowing RFID tag 22 to successfully communicate with the RFID reader in environments where tag interference may otherwise occur.

Although the exemplary tag 22 illustrated in FIG. 2 operates at only two frequencies, the variable frequency tag may be designed to operate at more than two frequencies. For example, tag 22 may include four sensing antennas and a four-way switch that selects the antenna that is operating most closely to the operating frequency of the RFID system. Furthermore, although in the example of FIG. 2 switching circuitry 18 switches a capacitive element in parallel with main antenna 14, switching circuitry may switch a capacitive element in series with main antenna 14, short out a capacitive element, or switch in an inductive element in either series or parallel with main antenna 14, or combinations thereof, to change the resonant frequency of main antenna 14. For example, main antenna 14 may be tuned to 13.56 MHz and sensing antenna 20 may be tuned to 20 MHz, and sensing circuitry 18 may short out capacitive element 26 in order to increase the resonant frequency of main antenna 14 when the current induced in sensing antenna 20 exceeds the desired threshold. Additionally, in some embodiments, switching circuitry 18 may measure which of the antennas 14, 20 is operating at a more optimum frequency using a current divider or some other circuit response measurement. The embodiment illustrated in FIG. 2 may be implemented with multiple circuit elements, a single circuit element, within integrated circuit 16, or a combination thereof.

Figure 3:
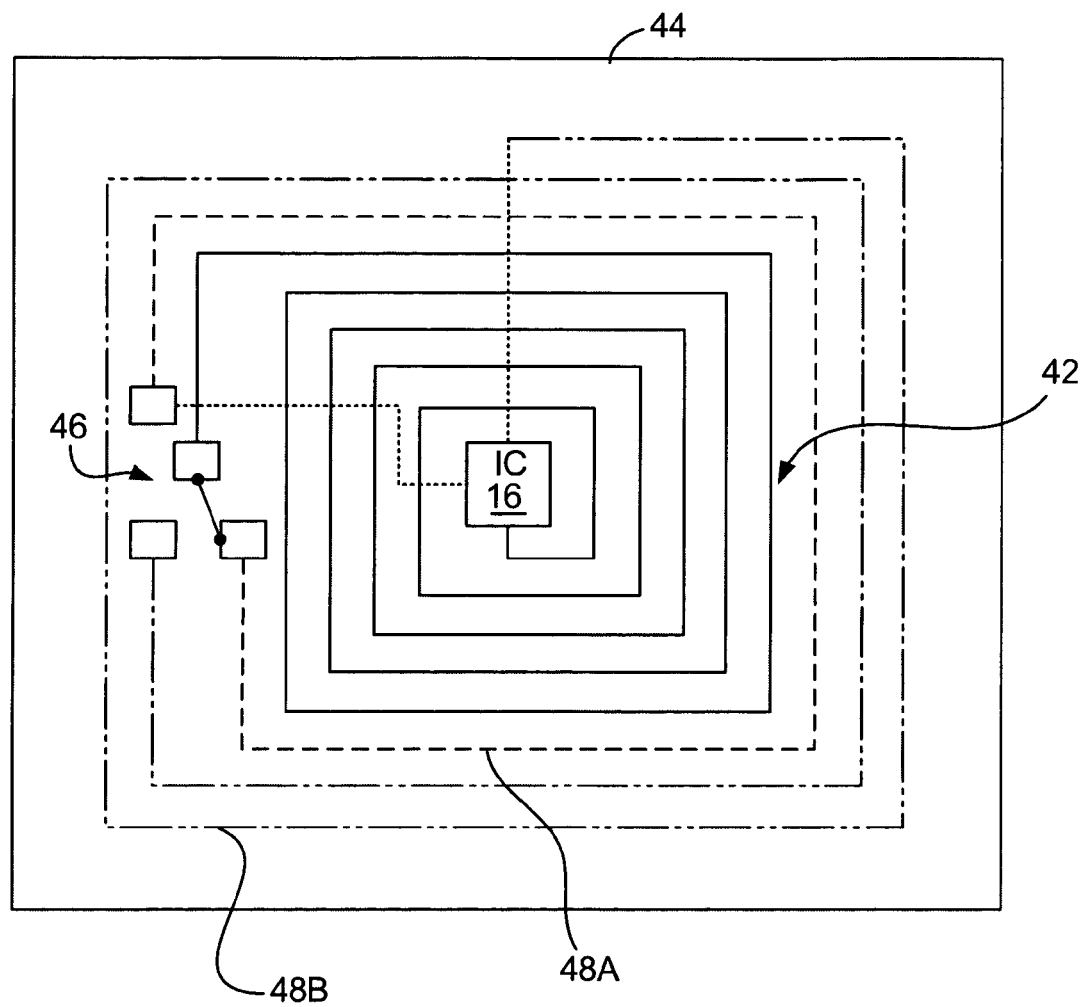
FIG. 3 is a schematic diagram illustrating another embodiment of an RFID tag capable of dynamically adjusting its resonant frequency.

FIG. 3 is a schematic diagram illustrating another embodiment of an RFID tag 44 capable of dynamically adjusting its resonant frequency. In the illustrated embodiment, RFID tag 44 includes a switch 46 that switches between inductive elements 48A and 48B in order to selectively include inductive elements 48A and 48B as additional loops for an antenna 42. In this manner, switch 46 is able to vary the frequency at which RFID tag 44 resonates.

Inductive elements 48A and 48B comprise portions of conductive traces fabricated to form additional loops for antenna 42. However, inductive elements 48A and 48B could be any component with an inductance, or completely separate antennas. As illustrated in the example of FIG. 3, inductive element 48A is physically shorter than inductive element 48B. Therefore, RFID tag 44 resonates at a higher frequency when switch 46 is positioned to contact inductive element 48A than when the switch contacts inductive element 48B.

Switch 46 may comprise a low power microelectromechanical system (MEMS) switch, a capacitor switch, or other switching component. Switch 46 may either be designed to automatically switch between inductive element 48A and inductive element 48B, e.g., during a single power-up cycle or on alternative power-up cycles. In one implementation, switch 46 comprises a low-power MEMS switch that changes the resonant frequency of RFID tag 44 at alternate power-up cycles. In this embodiment, MEMS switch 46 may require less power to switch positions than is necessary for integrated circuit 16 to function properly. Therefore, when RFID tag 44 receives enough power to activate MEMS switch 46, but not enough to power integrated circuit 16, the MEMS switch changes position in an attempt to draw enough current/voltage from the RF energy to power integrated circuit 16. MEMS switch 46 may, for example, change position after each time RFID tag 44 is powered down. In this manner, RFID tag 44 would alternate resonating at two different frequencies, e.g., 13.56 MHz and 20 MHz, at every other power-up cycle.

An interrogation device, therefore, may attempt a first read of all the RFID tags at a location. During the first read, depending on their current state, a first subset of the RFID tags will be configured to resonate at a system operating frequency, e.g., 13.56 MHz, and the remaining tags will be configured to resonate at the second frequency, e.g., 20 MHz. If no tag-to-tag coupling occurs, the interrogation device communicates with the first subset during the first read cycle, and then removes and reapplies the electromagnetic field to cause the RFID tags to change their resonant frequency. As a result, the first subset of tags will be configured to operate at the second frequency and the remaining tags will be configured to operate at the system frequency. Thus, the interrogation device will be able to communicate with the tags in no more than two interrogation cycles.

If there is tag-to-tag coupling, however, during the first interrogation cycle the resonant frequency of the RFID tags may be reduced. In particular, some or all of the RFID tags configured to operate at the system operating frequency will be reduced below a frequency range responsive to the interrogation device. Therefore, these RFID tags experiencing tag-to-tag coupling with neighboring tags may not successfully communicate with the interrogation device. However, the RFID tags configured to resonate at the system operating frequency that do not experience tag-to-tag coupling will be able to successfully communicate with the interrogation device. In addition, the resonant frequencies of some or all of the RFID tags configured to operate at the second frequency, e.g., 20 MHz will be similarly reduced closer to the operating frequency, and will be able to communicate with the interrogation device.

After reading all the detectable tags on the first read, the interrogation device automatically removes the RF field and initiates a second interrogation cycle, which causes the MEMS switches of the RFID tags to change position. During the second interrogation cycle, all of the tags that were unable to communicate with the interrogation device on the first interrogation attempt will be able to on the second read due to the changed inductance. Particularly, during the second interrogation cycle, the first subset of tags that were originally configured to resonate at the system operating frequency will now be configured to resonate at the second operating frequency, e.g., 20 MHz. The portion of these tags for which communication during the first interrogation cycle was unsuccessful due to tag-to-tag coupling will now be detuned by the tag-to-tag coupling from the second resonate frequency to a frequency closer to the system operating frequency and will achieve successful communication with the interrogation device. During the second read cycle the RFID tags that were originally configured to resonate at the second frequency will be configured to resonate at the system operating frequency. Those tags that were unable to communicate during the first read cycle, i.e., those tags that were not experiencing tag-to-tag coupling, will now achieve successful communication with the interrogation device. In this manner, in this configuration, the interrogation device is able to read all of the RFID tags in two read cycles or less. For embodiments of RFID tag 44 that use more than two additional inductive elements, e.g., three or more inductive elements, additional interrogation cycles may be utilized to ensure that all of the RFID tags achieve successful communication regardless of tag-to-tag coupling. These interrogation cycles can be merged and recorded by the interrogation device to obtain an accurate log of articles simultaneously present at the location.

In an alternate implementation, switch 46 selectively switches capacitive elements in and out of antenna 42 to change the resonant frequency of the antenna. Upon applying an RF field, RFID tag 44 resonates at a first frequency, e.g., the operating frequency of the RFID system (13.56 MHz), while the capacitor begins to collect charge. As soon as the capacitor collects enough charge, i.e., when it has been in the RF field for an extended period of time, switch 46 switches to a "charged" switch position. In the example illustrated in FIG. 3, the charged switch position may be the position that contacts inductive element 48B. At the "charged" switch position, RFID tag 44 resonates at a second frequency that allows communication to be achieved when sufficient tag-to-tag coupling occurs, e.g., 20 MHz. After the capacitor loses enough energy to be unable to hold the capacitor in the "charged" switch position, e.g., after the interrogation cycle is terminated, switch 46 changes back to the "uncharged" switch position. In this manner, switch 46 has a default switch position, e.g., initially resonating at 13.56 MHz. In this manner, RFID tag 44 automatically varies its resonant frequency during a single power-up cycle to ensure successful communication with the RF reader. In other words, in this configuration, the interrogation device need not apply two separate interrogation cycles.

Although in the example of FIG. 3 switch 46 of RFID tag 44 switches between two traces of different lengths to change the inductance of antenna 42, RFID tag 44 may use N different trace lengths and a 1 to N switch in order to allow N different frequency variations. Furthermore, switch 46 may be used to switch in other types of components, such as capacitive components, inductive components, or combinations thereof, to automatically adjust the resonant frequency of RFID tag 44. Additionally, RFID tag 44 may include sensing circuitry as described with respect to FIG. 2 to allow RFID tag 44 to select the switch position based upon which of the switch positions causes antenna 42 to operate at an optimum frequency, thereby auto-tuning RFID tag 44. The embodiment of FIG. 3 may be implemented with multiple "tag elements," on a single tag element, within an RFID chip, or a combination thereof.

Figure 4:
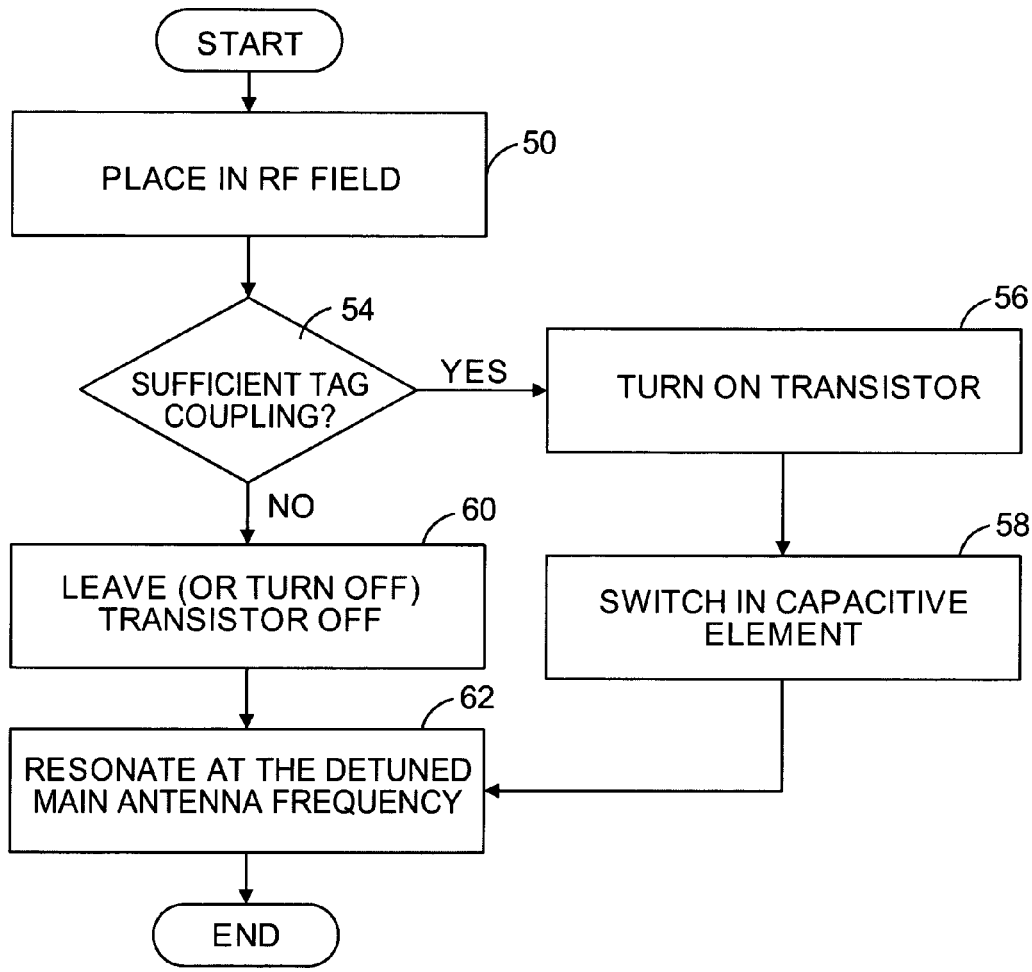
FIG. 4 is a flow diagram illustrating exemplary operation of an RFID tag, such as the RFID tag of FIG. 2, that auto-tunes its resonant frequency to compensate for coupling with neighboring tags.

FIG. 4 is a flow diagram illustrating exemplary operation of an RFID tag, such as RFID tag 22 of FIG. 2, that auto-tunes its resonant frequency to compensate for coupling with neighboring tags. Initially, RFID tag 22 is placed in an RF field (50). For example, RFID tag 22 may receive RF energy from an RFID detection device or reader antenna that is attempting to retrieve information from the RFID tag. The RF field within which RFID tag 22 is placed induces a current in both main antenna 14 and sensing antenna 20.

In general, switching circuitry 18 determines whether RFID tag 22 is experiencing sufficient tag-to-tag coupling to detune main antenna 14, which is set to a resonant frequency higher than the operating frequency of the RFID system, to resonate at an appropriate frequency, i.e., in a frequency range responsive to an interrogation device (54). For example, switching circuitry 18 may determine whether a current induced in sensing antenna 20 is sufficiently large to raise it beyond a threshold value. When switching circuitry 18 determines that insufficient tag-to-tag coupling is occurring, i.e., when the current induced in sensing antenna 20 is larger than a threshold value, transistor 40 turns on (56) and switches a capacitive element 24 in parallel with main antenna 14 (58). As described above, capacitive element 24 increases the capacitance of main antenna 14, thereby reducing the resonant frequency of main antenna 14 from the higher frequency, e.g., 20 MHz, to the system operating frequency, e.g., 13.56 MHz (62).

When switching circuitry 18 determines that sufficient tag-to-tag coupling is occurring to detune main antenna 14 from the higher resonant frequency to the system operating frequency, the switching circuitry turns off transistor 40 or transistor 40 remains off (60). As a result, main antenna 14 is configured to resonate at the higher frequency, but is detuned by the tag-to-tag coupling with neighboring tags in close proximity (62). In this manner, RFID tag 22 auto-tunes itself to achieve resonance at the system operating frequency in order to compensate for tag-to-tag coupling using a transistor 40 that is controlled based on the current induced by sensing antenna 20 relative to the current induced by main antenna 14. In other embodiments, other types of sensing and switching mechanisms may be used to auto-tune RFID tag 22.

Figure 5:
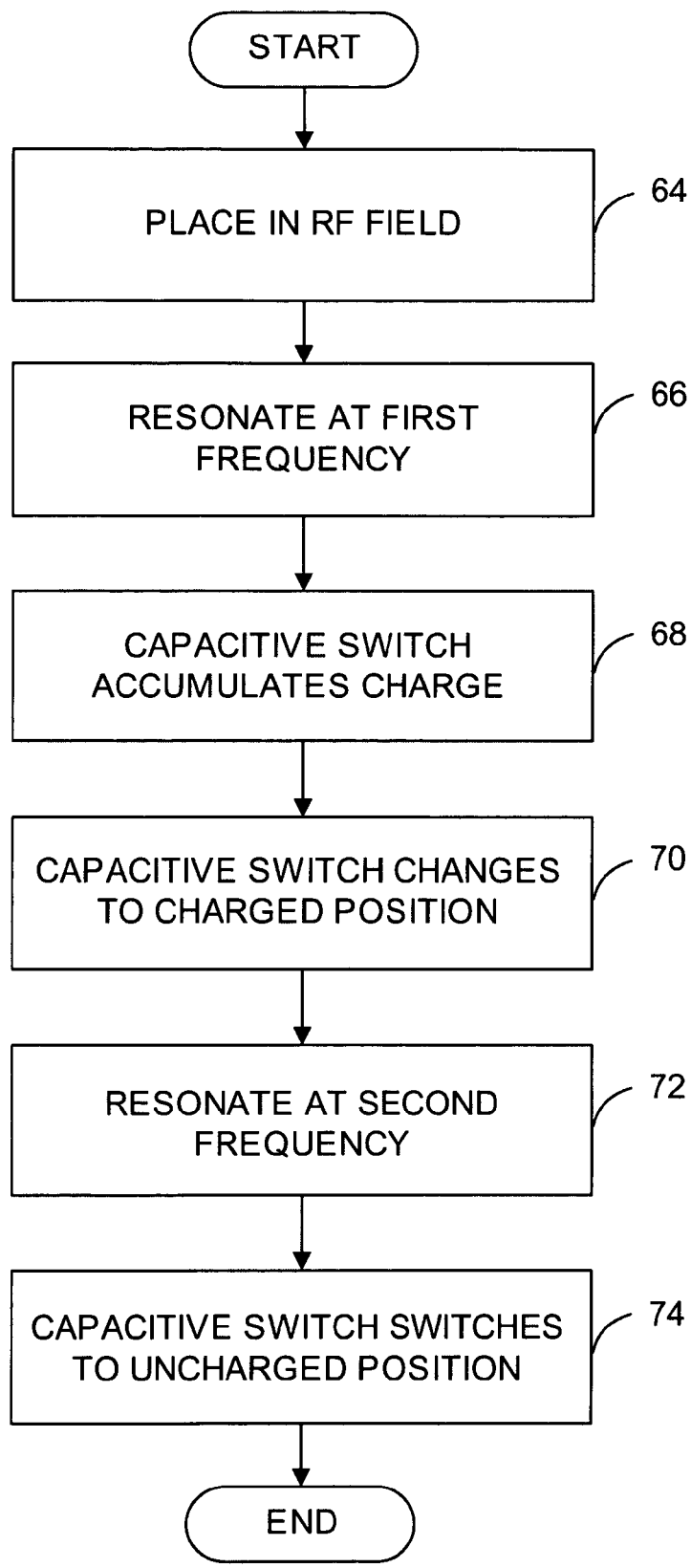
FIG. 5 is a flow diagram illustrating exemplary operation of an RFID tag, such as the RFID tag of FIG. 3, which includes a capacitive switch to dynamically change its resonant frequency.

FIG. 5 is a flow diagram illustrating exemplary operation of an RFID tag, such as RFID tag 44 of FIG. 3, which includes a switch 46 (e.g., a capacitive switch in this example) to dynamically change the resonant frequency of main antenna 14 without sensing whether main antenna 14 is resonating at an optimum frequency. Initially RFID tag 44 is placed in an RF field (64), and the tag is configured by default to resonate at a first frequency, such as the operating frequency of the RFID system, e.g., 13.56 MHz (66). However, if tag coupling is present, the resonant frequency will be reduced, possibly below a frequency range at which the tag is able to communicate with the interrogation device.

As a result of the electromagnetic field, the capacitive switch 46 begins to accumulate charge (68). When the charge of capacitive switch 46 collects enough charge, it switches to a "charged" switch position (70), and RFID tag 44 resonates at a second frequency (72), e.g., 20 MHz. When tag-to-tag coupling between neighboring tags exists, antenna 42 will be detuned from the higher resonant frequency to the lower operating frequency as described above. In this manner, the resonant frequency of RFID tag 44 varies during a single power-up cycle to ensure successful communication with the interrogation device without requiring two separate interrogation cycles. After the capacitor loses enough charge, e.g., when the interrogation field is removed, capacitive switch 46 is unable to hold the "charged" switch position, and the capacitive switch switches back to the "uncharged" switch position (74).

Figure 6:
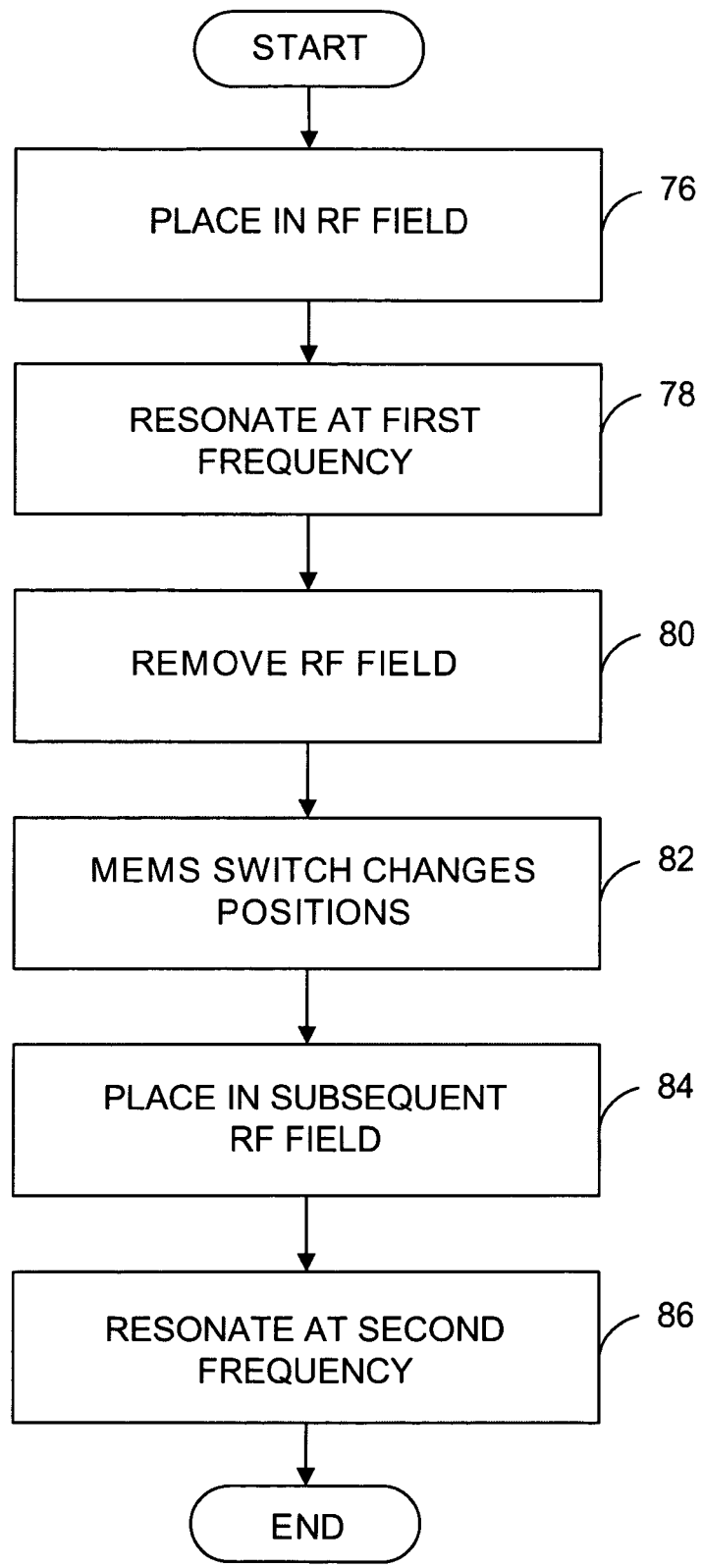
FIG. 6 is a flow diagram illustrating exemplary operation of an RFID tag, such as the RFID tag of FIG. 3, which includes a MEMS switch to dynamically change its resonant frequency.

FIG. 6 is a flow diagram illustrating exemplary operation of an RFID tag, such as RFID tag 44 of FIG. 3, which includes a MEMS switch to dynamically change the resonant frequency of main antenna 14 without sensing whether main antenna 14 is resonating at an optimum frequency. In this example, switch 46 comprises a MEMS switch that dynamically changes the resonant frequency of main antenna 14 between power-up cycles as described above.

Initially, RFID tag 44 is placed in an RF field (76), and RFID tag 44 is configured to resonate at a first frequency, such as the operating frequency of the RFID system, e.g., 13.56 MHz (78). If tag-to-tag coupling occurs, however, the resonant frequency of RFID tag 44 may be reduced below the frequency range responsive to the interrogation device, and the RFID tag may not successfully communicate with the interrogation device. The RF field is subsequently removed (80), e.g., after the interrogation devices reads all the RFID tags that respond to the first interrogation cycle, causing MEMS switch 46 to change positions (82). When a subsequent RF field is applied to RFID tag 44 (84), e.g., during a subsequent interrogation cycle, the RFID tag is configured to resonate at a higher frequency, e.g., 20 MHz (86), which will be detuned when tag-to-tag coupling with neighboring tags exists.

Figure 7:
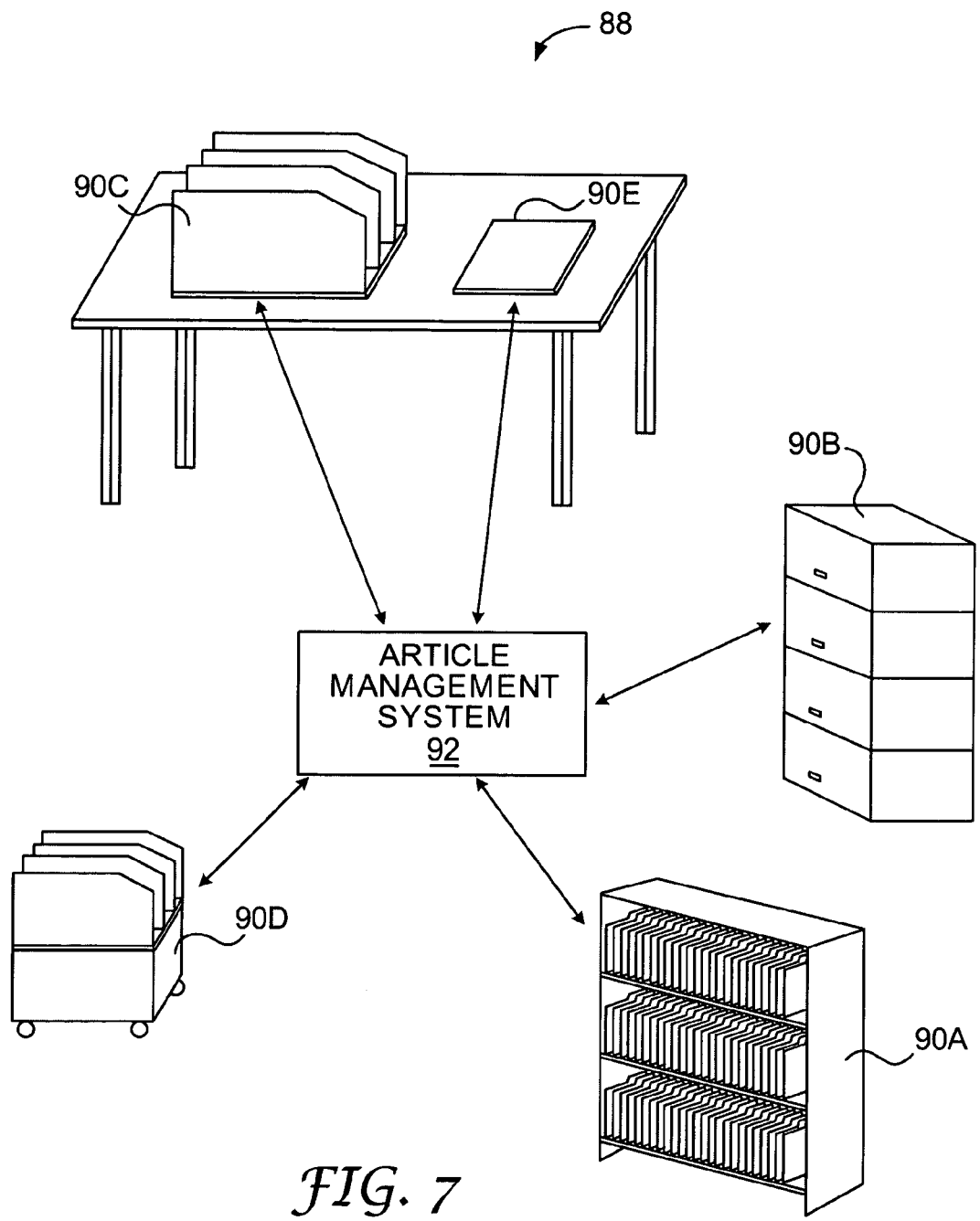
FIG. 7 is a block diagram illustrating an exemplary RFID system that may utilize RFID tags capable of varying their resonant frequencies to aid communication in environments wherein tag-to-tag coupling may occur.

FIG. 7 is a block diagram illustrating an exemplary RFID system 88 that may utilize RFID tags capable of varying their resonant frequencies to aid communication in environments wherein tag-to-tag coupling may occur. In the illustrated example of FIG. 7, RFID system 88 is used for document and file management. RFID system 88 may, for example, be deployed within law offices, government agencies, or other facilities that generate and store documents and files, such as business, criminal, and medical records.

In practice, these files may be positioned in a number of storage areas 90, e.g., as shown in FIG. 7, on an open shelf 90A, a cabinet 90B, a vertical file separator 90C, a cart 90D, a pad 90E or a similar location. Storage areas 90 may be provided at multiple locations within an organization, as opposed to in a single file room. For example, a storage area 90 may be associated with a particular location, e.g., a docketing shelf, and thus may be referred to or considered to be "dedicated" shelves. As also described below, storage areas 90 could be located near individual offices or other areas in, for example, a hospital or clinic, a law firm, an accounting firm, a brokerage house, or a bank.

In some embodiments, storage areas 90 may be "smart storage areas." The term "smart storage area" is used generally to refer to a storage area for a document or other item that is equipped with RFID interrogation capability to aid in tracking and locating documents or files within system 88. In particular, smart storage areas may include one or more antennas that are used to read RFID tags associated with the items stored in the respective storage areas and communicate the information read from the RFID tags to article management system 92 that provides a central data store, e.g., within one or more databases of a relational database management system (RDBMS), for aggregation of the information. The information may include, for example, position information that indicates where the file or document is located. File tracking system 92 may be networked or otherwise coupled to one or more computers so that individuals at various locations can access data relative to those items. For example, a user may use file tracking system 92 to retrieve the file location information from the data store, and report to the user the last location at which the items were located within one of the storage areas.

In an environment as illustrated in FIG. 7, the distance between the files or documents and, more particularly, the RFID tags associated with those articles generally cannot be fixed to a minimum distance. In accordance with the techniques described herein, the RFID tags of system 88 dynamically and automatically vary their resonant frequency to aid communication to an interrogation device, such as a smart storage area. As a result, tag-to-tag coupling may occur, yet the RFID tags may achieve increased ability to reliably communicate with the RFID interrogation devices of system 88.

RFID system 88 operates within a frequency range of the electromagnetic spectrum, such as 13.56 MHz, with an allowable frequency variance of +/−7 kHz, which is often used for Industrial, Scientific and Medical (ISM) applications. However, other frequencies may be used for RFID applications, and the invention is not so limited. For example, some RFID systems in large storage areas such as a warehouse may use an RFID system that operates at approximately 900 MHz.

Various embodiments of the invention have been described. These and other embodiments are within the scope of the following claims.

The invention claimed is:

1. A radio-frequency identification (RFID) tag comprising:
   a main antenna tuned to a first resonant frequency;
   switching circuitry that dynamically changes the resonant frequency of the main antenna; and
   a sensing circuit to sense electromagnetic coupling with a neighboring RFID tag and activate the switching circuit in response to the sensed eletromagnetic coupling.

2. The RFID tag of claim 1, further comprising a capacitive element, wherein the switching circuitry selectively electrically couples the capacitive element to the main antenna to change the resonant frequency of the main antenna.

3. The RFID tag of claim 2, wherein the switching circuitry couples the capacitive element in parallel with the main antenna to reduce the resonant frequency of the main antenna.

4. The RFID tag of claim 2, wherein the capacitive element comprises one of a capacitor, a diode, and a transistor.

5. The RFID tag of claim 1, further comprising an inductive element, wherein the switching circuitry selectively electrically couples the inductive element to the main antenna to dynamically change the resonant frequency of the main antenna.

6. The RFID tag of claim 1, further comprising:
   a first conductive trace of a first length; and
   a second conductive trace of a second length, wherein the first length is greater than the second length, and further wherein the switching circuitry selectively couples the first conductive trace or the second conductive trace to the main antenna to change the resonant frequency of the main antenna.

7. The RFID tag of claim 1, wherein the switching circuitry comprises a microelectromechanical system (MEMS) switch that selects different electrical elements to change the resonant frequency.

8. The RFID tag of claim 1, wherein the switching circuitry comprises a capacitive switch that changes the resonant frequency of the main antenna based upon a stored charge.

9. The RFID tag of claim 1, wherein the sensing circuit senses an amount of electromagnetic coupling with the neighboring RFID tag, and activates the switching circuit to selectively increase or decrease the resonant frequency of the main antenna based on the sensed amount of electromagnetic coupling.

10. The RFID tag of claim 1, wherein the switching circuitry comprises a transistor that turns on when a current in the sensing circuit exceeds a threshold value.

11. The RFID tag of claim 1, wherein the switching circuitry further comprises a first resistor and a second resistor arranged to realize a voltage divider to regulate the threshold value at which the transistor turns on.

12. The RFID tag of claim 1, further comprising a sensing antenna tuned to a second resonant frequency, wherein the switching circuitry changes the resonant frequency of the main antenna based on an amount of current induced within the sensing antenna.

13. The RFID tag of claim 12, wherein the main antenna and the sensing antenna are coplanar.

14. The RFID tag of claim 12, wherein the sensing antenna is tuned to approximately 13.56 megahertz (MHz) and the main antenna is tuned to approximately 20 MHz.

15. The RFID tag of claim 1, wherein the switching circuitry automatically changes the resonant frequency of the main antenna upon application or removal of a radio frequency field to the RFID tag.

16. The RFID tag of claim 1, further comprising an RFID integrated circuit electrically coupled to the main antenna that stores information of an associated article and communicates the information to an RFID reader via the main antenna.

17. A method comprising:
operating a main antenna of a radio frequency identification (RFID) tag at an associated resonate frequency;
sensing an amount of electromagnetic coupling between the RFID tag and a neighboring RFID tag; and
dynamically changing the resonant frequency of the main antenna based on the sensed amount of electromagnetic coupling.

18. The method of claim 17, wherein dynamically changing the resonant frequency comprises selectively coupling a capacitive element to the main antenna to selectively increase or decrease the resonant frequency of the main antenna.

19. The method of claim 18, wherein the capacitive element comprises one of a capacitor, a diode, and a transistor.

20. The method of claim 17, wherein dynamically changing the resonant frequency comprises selectively coupling an inductive element to the main antenna to change the resonant frequency of the main antenna.

21. The method of claim 17, wherein dynamically changing the resonant frequency comprises selectively coupling a first conductive trace of a first length or a second conductive trace of a second length to the main antenna to change the resonant frequency of the main antenna.

22. The method of claim 17, wherein the RFID tag includes a sensing antenna having a resonant frequency different from the resonant frequency associated with the main antenna, and wherein dynamically changing the resonant frequency comprises dynamically changing the resonant frequency associated with the main antenna when a current induced in the sensing antenna exceeds a threshold value.

23. The method of claim 22, wherein the resonant frequency of the sensing antenna is tuned to approximately 13.56 megahertz (MHz) and the resonant frequency of the main antenna is tuned to approximately 20 MHz.

24. The method of claim 17, wherein dynamically changing the resonant frequency comprises dynamically changing the resonant frequency of the main antenna upon application or removal of a radio frequency field to the RFID tag.

25. A radio frequency identification (RFID) system comprising:
an RFID interrogation device;
an RFID tag associated with an article, wherein the interrogation device interrogates the RFID tag to obtain information regarding the article; and
a computing device to process the information retrieved from the RFID interrogation device,
wherein the RFID tag includes a main antenna tuned to a first resonant frequency, an integrated circuit electrically coupled to the main antenna that stores information of the associated article, switching circuitry that selectively couples one or more elements to the main antenna to adjust the resonant frequency of the main antenna, and a sensing circuit to sense electromagnetic coupling with a neighboring tag and activate the switching circuit in response to the sensed electromagnetic coupling.

26. The system of claim 25, wherein the one or more elements includes a capacitive element, and the switching circuitry selectively couples the capacitive element to the main antenna.

27. The system of claim 26, wherein the switching circuitry selectively couples the capacitive element in parallel with the main antenna to reduce the resonant frequency of the main antenna.

28. The system of claim 26, wherein the capacitive element comprises one of a capacitor, a diode, and a transistor.

29. The system of claim 25, wherein the one or more elements includes an inductive element, and the switching circuitry selectively couples the inductive element to the main antenna.

30. The system of claim 25, wherein the one or more elements includes a first conductive trace of a first length and a second conductive trace of a second length, and the switching circuitry selectively couples the first conductive trace or the second conductive trace to the main antenna.

31. The system of claim 25, wherein the switching circuitry comprises one of a microelectromechanical system (MEMS) switch and a capacitive switch.

32. The system of claim 25, wherein the sensing circuit senses an amount of electromagnetic coupling with a neighboring RFID tag, and activates the switching circuit to selectively couple the one or more elements to the main antenna based on the sensed amount of electromagnetic coupling to selectively increase or decrease the resonant frequency of the main antenna.

33. The system of claim 32, wherein the main antenna and the sensing antenna are coplanar.

34. The system of claim 32, wherein the sensing antenna is tuned to approximately 13.56 megahertz (MHz) and the main antenna is tuned to approximately 20 MHz.

35. The system of claim 25, wherein the sensing circuit comprises a sensing antenna tuned to a second resonant frequency different from the first resonant frequency, and the switching circuitry selectively couples the one or more elements to the main antenna when the current in the sensing antenna exceeds a threshold value.

36. The system of claim 35, wherein the switching circuitry comprises a transistor that turns on when the current in the sensing antenna exceeds the threshold value.

37. The system of claim 36, wherein the switching circuitry further comprises a first resistor and a second resistor arranged to realize a voltage divider to regulate the threshold value at which the transistor turns on.

38. The system of claim 25, wherein the switching circuitry automatically changes the resonant frequency of the main antenna upon application or removal of a radio frequency field to the RFID tag.

* * * * *

UNITED STATES PATENT AND TRADEMARK OFFICE
CERTIFICATE OF CORRECTION

PATENT NO. : 7,132,946 B2  Page 1 of 1
APPLICATION NO. : 10/820584
DATED : November 7, 2006
INVENTOR(S) : Michele A. Waldner It is certified that error appears in the above-identified patent and that said Letters Patent is hereby corrected as shown below:

Column 12,
Line 13, delete "eletromagnetic" and insert -- electromagnetic --.

Signed and Sealed this

Ninth Day of January, 2007

JON W. DUDAS
*Director of the United States Patent and Trademark Office*